(12) United States Patent
Hu et al.

(10) Patent No.: US 8,756,017 B2
(45) Date of Patent: Jun. 17, 2014

(54) METHOD FOR DETECTING FORMATION RESISTIVITY OUTSIDE OF METAL CASING USING TIME-DOMAIN ELECTROMAGNETIC PULSE IN WELL

(75) Inventors: Wenbao Hu, Jingzhou (CN); Liangjun Yan, Jingzhou (CN); Junmin Wang, Jingzhou (CN); Zhenping Xu, Jingzhou (CN); Mingzhang Luo, Jingzhou (CN); Zhuliu Su, Jingzhou (CN); Xingong Tang, Jingzhou (CN); Diren Liu, Jingzhou (CN); Qingli Chen, Jingzhou (CN); Xingbing Xie, Jingzhou (CN); Kui Xiang, Jingzhou (CN); Yurong Mao, Jingzhou (CN)

(73) Assignee: Yangtze University, Jingzhou (CN)

( * ) Notice: Subject to any disclaimer, the term of this patent is extended or adjusted under 35 U.S.C. 154(b) by 458 days.

(21) Appl. No.: 13/178,548

(22) Filed: Jul. 8, 2011

(65) Prior Publication Data
US 2012/0215448 A1 Aug. 23, 2012

Related U.S. Application Data

(63) Continuation of application No. PCT/CN2011/076930, filed on Jul. 7, 2011.

(30) Foreign Application Priority Data

Feb. 17, 2011 (CN) .......................... 2011 1 0039335

(51) Int. Cl.
*G01V 3/28* (2006.01)
(52) U.S. Cl.
CPC ....................... *G01V 3/28* (2013.01)
USPC .............................................. 702/7
(58) Field of Classification Search
CPC ........................................ G01V 3/28
USPC .............................................. 702/7
See application file for complete search history.

(56) References Cited

U.S. PATENT DOCUMENTS

| | | | |
|---|---|---|---|
| 2001/0038287 A1* | 11/2001 | Amini ........................... | 324/341 |
| 2005/0077902 A1* | 4/2005 | MacGregor et al. .......... | 324/334 |

\* cited by examiner

*Primary Examiner* — Bryan Bui
(74) *Attorney, Agent, or Firm* — Matthias Scholl P.C.; Matthias Scholl (57) ABSTRACT

A method for detecting formation resistivity outside of metal casing using time-domain electromagnetic pulse in a borehole, the method including steps of a) providing a borehole large power pulse transmitting source, recording an induced electromotive force $\epsilon$, and full time digital recording a transmitted waveform and a received signal; b) conducting transmission-reception and superimposing received signals to improve signal to noise ratio; c) calculating corresponding casing response according to known casing parameters and recorded current waveform of the transmitting source to obtain a relative induced electromotive force $\Delta\epsilon_f$; d) correcting relative induced electromotive force value; e) carrying out one-dimensional inversion and converting the observation signal into radial variation information of the formation resistivity; f) obtaining a two-dimensional image of the longitudinal and radial resistivity distribution of outer cased formation resistivity for measured well sections; and g) determining residual oil distribution in a reservoir from outer cased reservoir resistivity distribution.

8 Claims, 6 Drawing Sheets

METHOD FOR DETECTING FORMATION RESISTIVITY OUTSIDE OF METAL CASING USING TIME-DOMAIN ELECTROMAGNETIC PULSE IN WELL

CROSS-REFERENCE TO RELATED APPLICATIONS

This application is a continuation of International Patent Application No. PCT/CN2011/076930 with an international filing date of Jul. 7, 2011, designating the United States, now pending, and further claims priority benefits to Chinese Patent Application No. 201110039335.0 filed Feb. 17, 2011. The contents of all of the aforementioned applications, including any intervening amendments thereto, are incorporated herein by reference.

BACKGROUND OF THE INVENTION

1. Field of the Invention

The invention relates to borehole geophysical measurement and oil field development technology, and more particularly to a borehole electromagnetic detection method to acquire outer cased well formation resistivity distribution information by means of borehole excitation and observation of electromagnetic field changes to evaluate remaining oil distribution in oil reservoir development.

2. Description of the Related Art

Because electrical parameters of a reservoir medium are closely related to reservoir porosity, pore fluid property, and saturation, the electrical parameters when the reservoir contains oil gas have a huge difference from those when the reservoir contains formation water. The electrical parameter of the reservoir medium is a major parameter to determine and evaluate oil-bearing property of the reservoir. Thus, electrical or electromagnetic methods have always been important to realize quantitative evaluation of reservoir oil-bearing property. As it can be done directly in wells to measure in the middle or near the middle of a reservoir, well logging is one of the geophysical detection methods with a highest resolution.

Electrical logging used for the borehole formation resistivity measurement has two methods including DC resistivity logging and induction logging, in which the DC resistivity logging is to supply a DC current to the ground in a well or near a well wall and measure the potential difference to obtain the formation resistivity within a certain offset distance; the induction logging is based on the principle of electromagnetic induction, which supplies an AC current in a transmitting coil to generate an AC magnetic field excitation and obtains formation conductivity by measuring the second field produced by an eddy current within a certain offset distance.

In recent years, along with the development of information technology, domestic and international geophysical communities have researched and developed a crosshole electromagnetic tomography (CT) technique for measurement and imaging of crosshole resistivity distribution. Compared with conventional electrical logging, it has a deeper and broader detection range and compared with ground electromagnetic method, it has higher accuracy and resolution without being affected by a well depth. One of the challenges facing the borehole electromagnetic wave CT is conflict between detection range and resolution. The formation suitable for oil and gas reservoir is generally a strong loss medium for electromagnetic wave. If we intend to increase the detection range, transmission power must be increased and transmission frequency must be reduced. However, decreasing of the frequency will affect the resolution. In the application of oil field development, intensity attenuation of metal casing is also a problem. Theoretical studies show that, when transmitting with a vertical magnetic dipole source in a cased well and receiving in another borehole, if the transmission source frequency is of hundreds of hertz, a signal can penetrate the casing to radiate the formation. However when wells are both cased ones, signal detection is almost impossible. When a casing collar is in insulation connection, each section of the casing can be used as a transmitting antenna with a better effect, but it is unachievable in actual constructions of well drilling.

As to formation resistivity measurement in oil reservoir development, the main challenge is still the strong shielding effects of metal casing on electromagnetic field, making it difficult for measurements of either DC or induction field. With development of electronic technology and improvement of weak signal detection technology, foreign scholars have studied and achieved to supply power for casing walls and measure ultra weak gradient electric potential signal on casing walls with a view to obtain the formation resistivity information of outer cased formation by converting to a DC resistivity curve. Several logging technology service companies in USA such as Schlumberger, Haliburton, and Baker Atlas, have developed a through-casing resistivity logging instrument based on DC voltage potential measurement. This kind of through-casing resistivity logging method, which is affected by many factors in practical applications, makes it difficult to be popularized. First of all, because power supply and measurement must be implemented very close to well walls, casing walls need to be cleaned before measurement. Such cleaning work has high cost. If the cleaning work is not thorough, it will cause a great measurement error due to poor contact. This problem is caused by limitations of observation methodology. Measurement by direct contact with casing walls is more susceptible to the impacts of casing collars and perforating points, leading to difficulties in data interpretation. Second, because such method uses direct current power supply which is diffused into the different layer of formations through the casing and the DC diffusion field itself has no depth sounding ability, explorers have to rely on changes of electrode distance to distinguish the formation resistivity in layer of formations. Finally, due to the restriction of logging cables, supply current will not be high enough (<6 A). Thus, such method is very limited to detect depth. Consequently, as cement sheath have important impacts on observed data, it needs fine processing and correction in the interpretation, and inner reservoir resistivity distribution information within a certain distance from the well wall cannot be obtained at all.

SUMMARY OF THE INVENTION

One objective of the invention is to provide a borehole electromagnetic method using a large power pulse source to excite in a steel cased well and observe changes of magnetic induction electromotive force with time so as to acquire radial distribution information of outer formation resistivity through data processing and to evaluate remaining oil distribution in oil reservoir development.

The objective is achieved in accordance with one embodiment of the invention by the following technical schemes.

Equipment used in this embodiment comprises two parts: a ground instrument and a downhole instrument, wherein the ground instrument provides power supply and control for the downhole instrument. The method comprises the steps of:

1) In a target well section comprising a metal casing, supplying a pulse current to a transmitting coil of a large power pulse transmitting source of a downhole instrument to generate an instantaneous high power pulsed magnetic field excitation; recording an induced electromotive force $\epsilon$ using a receiving and recording system of the downhole instrument through a receiving coil with certain distance from the transmitting source, the induced electromotive force $\epsilon$ changing with time and being produced by a vertical component Bz of a magnetic field; and full time digital recording a transmitted waveform and a received signal;

The large power pulse transmitting source of the downhole instrument comprising:

The pulse waveform being a quasi-gaussian pulse;
Maximum instantaneous pulse current >30 A;
Maximum instantaneous pulse power >100 kW;
Pulse width <100 ms;
The receiving record system of the downhole instrument comprising:
Multichannel magnetic induction sensor receiving and channel distance: 0.25 m;
Minimum reception-transmission distance: 1.0 m;
Time sequence recording length of reception signals: 1 s;

2) Conducting transmission-reception at the same depth point for multiple times and superimposing received signals to improve signal to noise ratio; the number of times for multiple transmission times: 30-100 pulses;

3) Calculating corresponding casing response according to known casing parameters (diameter, thickness, electric conductivity, magnetic conductivity) and recorded current waveform of the transmitting source to obtain a relative induced electromotive force $\Delta\epsilon_f$ of outer cased formation:

$$\Delta\varepsilon_f = \frac{\varepsilon_o - \varepsilon_c}{\varepsilon_c} \quad (1)$$

wherein, $\epsilon_O$ represents an observed induced electromotive force and $\epsilon_C$ represents a calculated casing response;

Calculation of the metal casing response being obtained through a numerical solution of the magnetic dipole source response of an axisymmetric radially-stratified model;

Typical parameters of the metal casing being as follows:
Inner diameter of the casing: 0.08-0.12 m;
The casing wall thickness: 0.006-0.02 m;
Electric conductivity of the casing: $10^5$-$10^7$ S/m;
Relative magnetic conductivity of the casing: $10^2$-$10^5$;

4) Correcting relative induced electromotive force value according to the information of the casing collar and perforating position;

5) Carrying out one-dimensional inversion and converting the observation signal, changing with time, into radial variation information of the formation resistivity surrounding a well;

6) Obtaining a two dimensional image of the longitudinal and radial resistivity distribution of outer cased formation resistivity for measured well sections according to the inversion resistivity of different measuring points; and 7) According to electrical logging data and interpretation results after the well completed, determining residual oil distribution in a reservoir from outer cased reservoir resistivity distribution.

In a class of this embodiment, the electromagnetic excitation and measurement in the cased well is an induction method, the transmitting and receiving devices are both not directly connected to the casing walls; the receiving system is capable of recording data changes of the magnetic induction electromotive force with time and has the function of time domain sounding, then after data processing and inversion, the radial variation information of the formation resistivity surrounding the well can be obtained; by using the resistivity measurement data after the well is completed, for calibration, the reservoir oil saturation distribution or changing images from a certain radial distance around the well can be obtained to achieve the remaining oil evaluation of the oil reservoir development.

According to the invention, the well needs not to be cleaned and probe radius is large. When great instantaneous current is obtained, average power consumption of a power supply is not too large. Since most of the present logging instruments cannot break through the restriction of the steel casing, they cannot be used in steel cased wells. However devices used in the invention successfully break the restriction of the steel casing. As average power is small, logging instrument cables can be connected without any changes and then the use cost will be reduced.

The invention employs special technology to enclose all power supply instruments and measuring instruments within a tube and explorers are able to carry out exploration work by using the ground instruments. According to the invention, weight of the instruments has been greatly reduced, energy has been saved, and instantaneous power is huge. The response value of high power electromagnetic pulse uses resistivity to describe the distribution around the well. Consequently information relating to geologic structures can be obtained and an effective evaluation method is available to evaluate remaining oil in oil reservoir development.

DETAILED DESCRIPTION OF THE EMBODIMENTS

Figure 1:
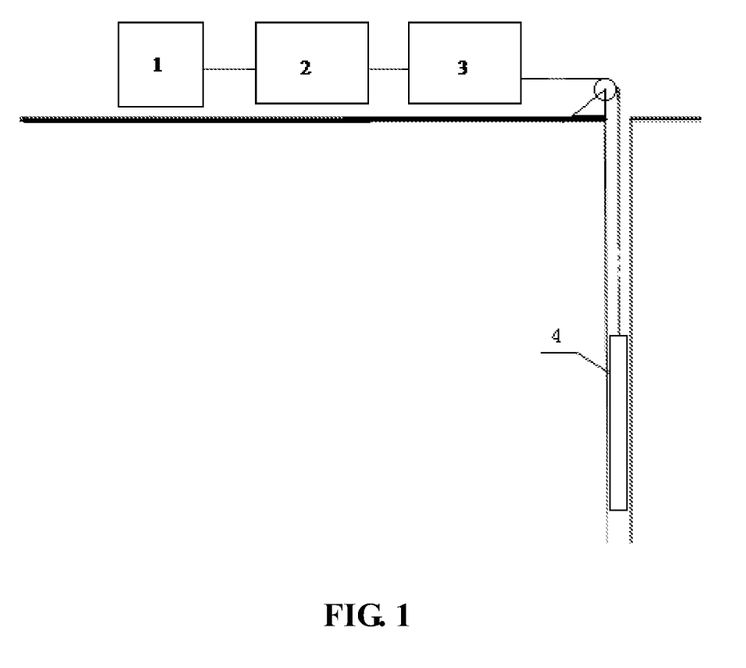
FIG. 1 is a schematic diagram of an observation scheme for a time-domain pulsed electromagnetic method in a cased well designed in accordance with one embodiment of the invention.

This invention is explained in further detail below with the aid of the example and attached drawings:

A time-domain pulsed electromagnetic method comprising electromagnetic pulse transmission and magnetic signal reception in a cased well has been employed for field data acquisition of formation resistivity through a metal casing and the observation scheme is as shown in FIG. 1. A generator 1 supplies power to a transmitting system of a downhole instrument 4 through a transmission control device 2 and a wellhead control device 3. The receiving and recording system of the downhole instrument will record the data of a borehole induced electromotive force changing with time under electromagnetic pulse excitation.

Figure 2:
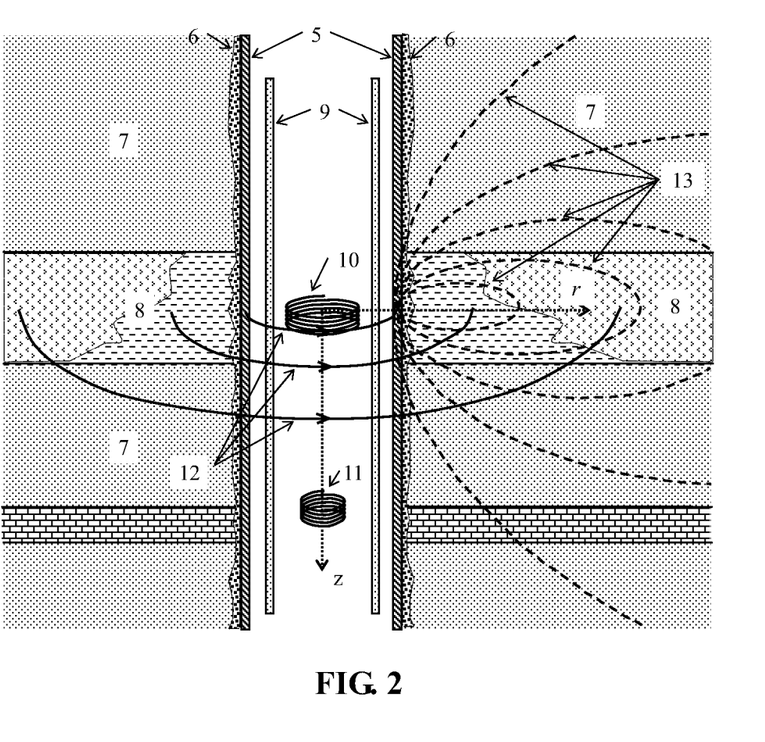
FIG. 2 is a principle diagram of a formation resistivity detection through metal casing achieved according to one embodiment of the invention.

The working principle of the downhole instrument is as shown in FIG. 2. A metal casing 5 used in oil well development is consolidated with formation by a casing cement 6. The formation is divided into a surrounding strata 7 and a reservoir 8 having certain porosity and the reservoir contains fluid such as oil, water, or gas. Due to heterogeneity of the reservoir, the oil-water interface of the reservoir's remaining oil may be far away from the well wall and the distribution may be more complicated. An objective of the invention is to obtain radial distribution information of the formation resistivity through observation of electromagnetic pulse decay with time so that explorers can infer fluid distribution of such reservoir. To avoid electromagnetic shielding, a casing 9 of the downhole instrument is made of non-metallic materials. A high power pulse current is supplied to a transmitting coil 10 by the borehole transmitting control device and the generated magnetic field will induce an eddy current 12 in inner or outer metal cased formation. The eddy current in the formation is generally weak, which is typically less than $1/10000$ the induction eddy current within the casing; but the thinner the casing wall, the higher the pulse power and the longer the pulse duration, therefore the effect of the induced eddy current within the formation will become greater. A secondary inductive field 13 produced by the eddy current within the formation will affect the distribution of the electromagnetic field within the casing, however the distribution information of the outer formation resistivity can be obtained after processing the induced electromotive force changes in the casing recorded by a receiving coil 11.

Figure 3:
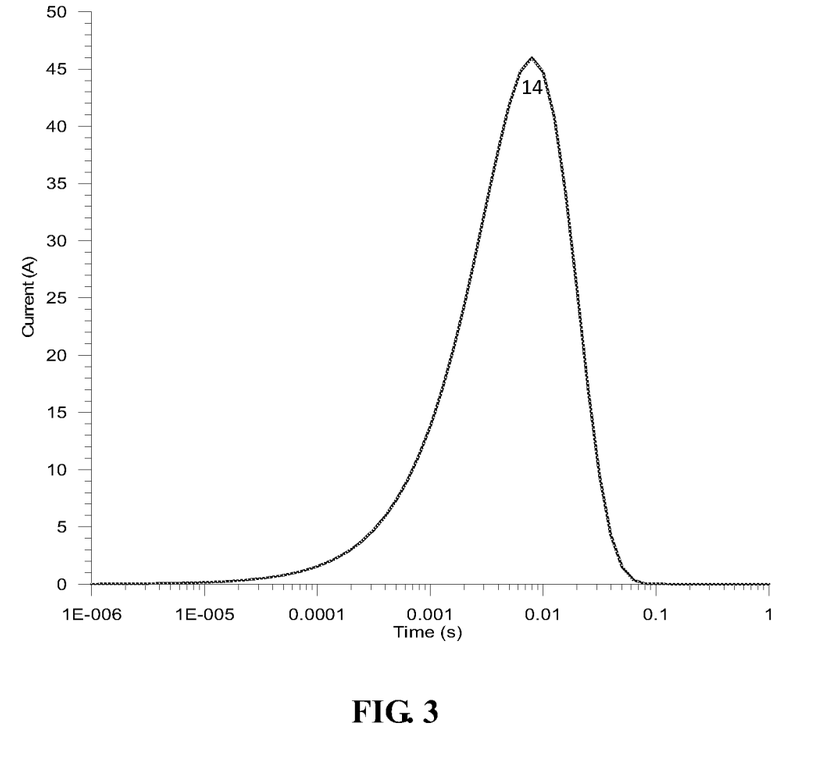
FIG. 3 is a schematic diagram of a quasi-gaussian pulse excitation current waveform adopted in this invention.

To break through the shielding effect of the metal casing, the transmitting power is required to be large enough and the pulse duration long enough. The quasi-gaussian pulse waveform adopted in this invention is as shown in FIG. 3. The instantaneous peak current of a pulse 14 occurs at approximately 0.01 s, the maximum value is greater than 45 A and the pulse duration is close to 0.1 s.

Figure 4:
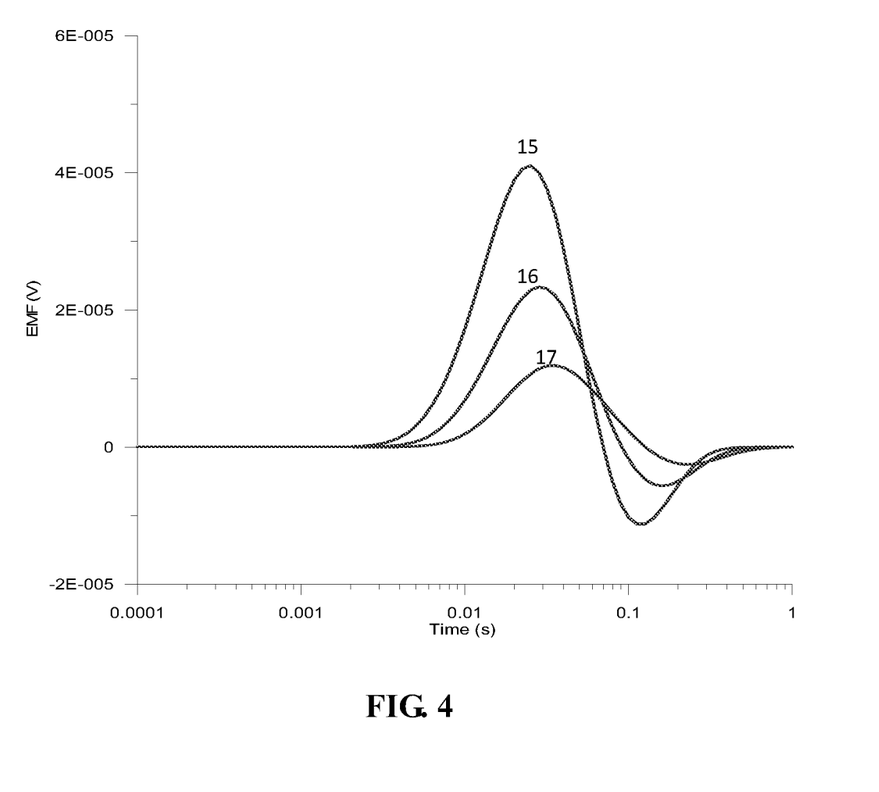
FIG. 4 is a curve diagram of observed borehole induction electromotive force for conductivity through different casings according to one embodiment of the invention.

When a high power pulse current 14 passes through the transmitting coil 10, the magnetic induction electromotive force, as shown in FIG. 4, will be observed in the receiving coil 11 at a certain distance from the transmitting coil 10 within the casing. Curves 15, 16, and 17 shown in the figure correspond to the observed induced electromotive force of perpendicular magnetic fields in the casing when the casing resistivity are $7\times10^{-5}$, $1\times10^{-6}$ and $1.5\times10^{-6}$ ΩM respectively. Therefore, it can be concluded that the casing resistivity have attenuation and time shift functions with respect to the observed electromagnetic fields and the casing resistivity has significant influence on borehole observation response.

Figure 5:
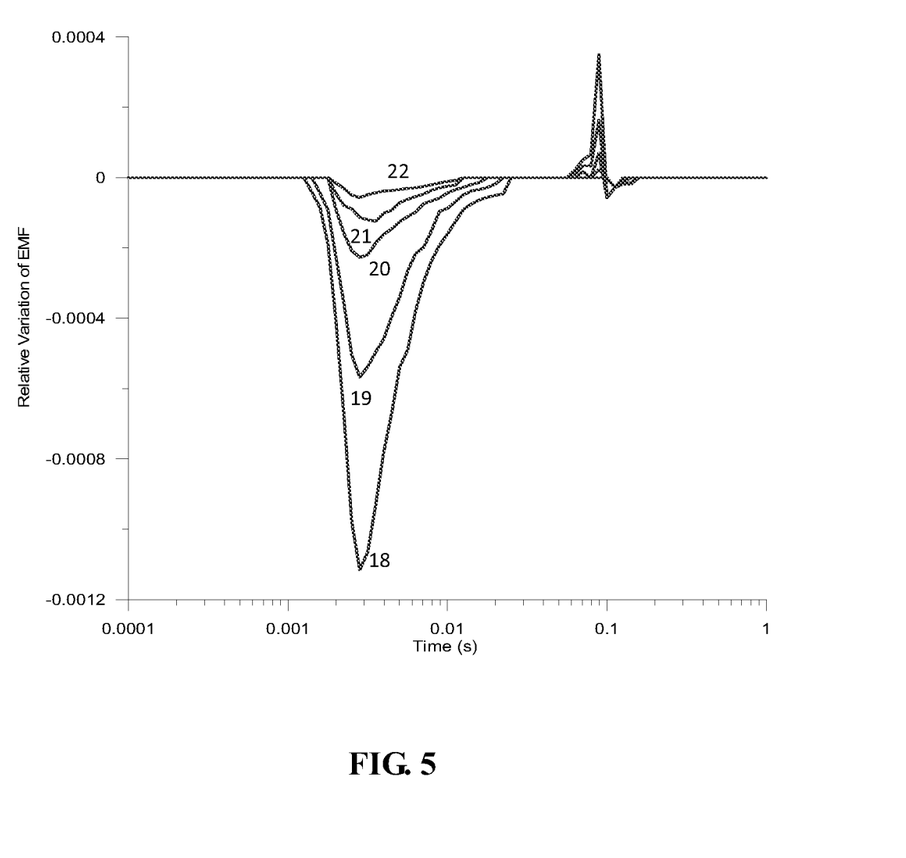
FIG. 5 is a schematic diagram of observed borehole induction electromotive force variations for formations with different conductivity according to one embodiment of the invention.
Figure 6:
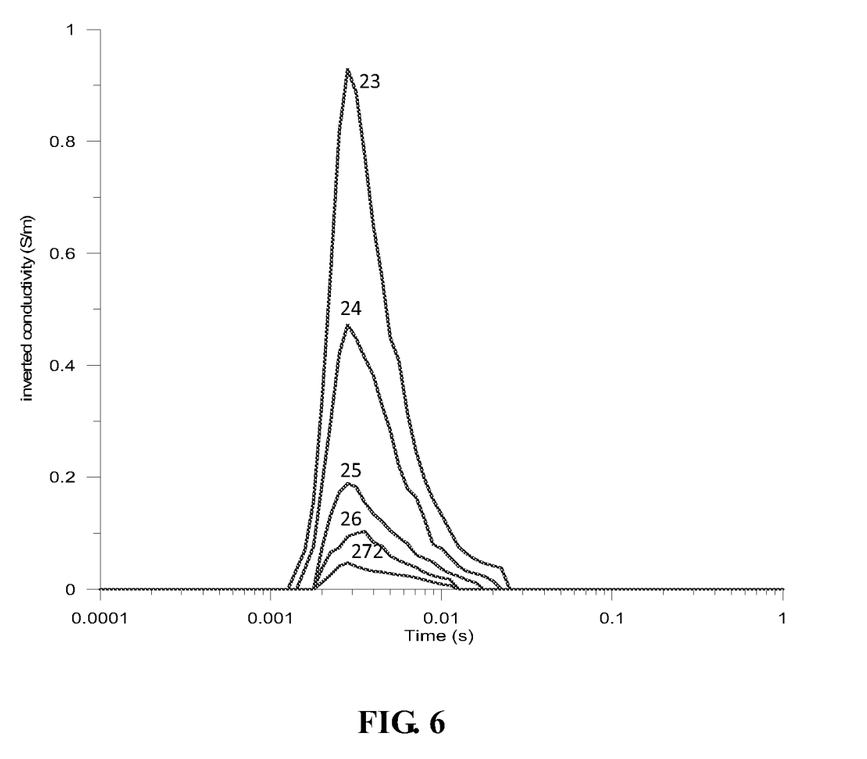
FIG. 6 is a curve diagram of formation conductivity inversed from observed borehole induction electromotive force variations according to one embodiment of the invention.

When outer cased formation conductivity (reciprocal of resistivity) is different, the electromagnetic response observed in the borehole only shows weak changes because of the shielding effect of the metal casing. The weak response related to the formation conductivity can be extracted by studying relative response changes of different formation conductivities. When the casing conductivity is $10^6$ S/m as shown in FIG. 5, the relative response of the conductivities in different formations can be calculated according to equation (1) and the curves 18-22 is relative change curves of the induced electromotive force when the formation conductivities are 1, 0.5, 0.2, 0.1, and 0.04 S/m. As can be seen, relative response amplitude of the induced electromotive force is able to effectively reflect the formation conductivity changes, thus the curves of the formation apparent conductivity changing with time can be obtained as shown in FIG. 6, the curves 23-27 respectively correspond to the formation with conductivities of 1, 0.5, 0.2, 0.1, and 0.04 S/m. As can be seen from the diagram, maximum value of the apparent conductivity curve is very close to the true formation conductivity.

The invention claimed is:

1. A method for detecting formation resistivity outside a metal casing using borehole time-domain electromagnetic pulse, the method comprising the steps of:
   a) in a target well section comprising a metal casing, supplying a pulse current to a transmitting coil of a large power pulse transmitting source of a downhole instrument to generate an instantaneous high power pulsed magnetic field excitation; recording an induced electromotive force ϵ using a receiving and recording system of the downhole instrument through a receiving coil with certain distance from the transmitting source, the induced electromotive force ϵ changing with time and being produced by a vertical component Bz of a magnetic field; and full time digital recording a transmitted waveform and a received signal;
   b) conducting transmission-reception at the same depth point for multiple times and superimposing received signals to improve signal to noise ratio;
   c) calculating corresponding casing response according to known casing parameters and recorded current waveform of the transmitting source to obtain a relative induced electromotive force $\Delta\epsilon_f$ of an outer cased formation:

$$\Delta\varepsilon_f = \frac{\varepsilon_o - \varepsilon_c}{\varepsilon_c}$$

wherein, $\epsilon_O$ represents an observed induced electromotive force and $\epsilon_C$ represents a calculated casing response;
   d) correcting relative induced electromotive force value according to the information of casing collars and perforating positions;
   e) carrying out one-dimensional inversion and converting the observation signal, changing with time, into radial variation information of the formation resistivity surrounding a well;
   f) obtaining a two dimensional image of the longitudinal and radial resistivity distribution of outer cased formation resistivity for measured well sections according to the inversion resistivity of different measuring points; and
   g) according to electrical logging data and interpretation results after the well completed, determining residual oil distribution in a reservoir from outer cased reservoir resistivity distribution.

2. The method of claim 1, wherein the electromagnetic excitation and measurement in the cased well is an induction method, and both the transmitting and the receiving devices are not directly connected to the casing walls.

3. The method of claim 1, wherein the receiving system is capable of recording data changes of the magnetic induction electromotive force with time and has the function of time domain sounding, then after data processing and inversion, the radial variation information of the formation resistivity surrounding the well can be obtained.

4. The method of claim 1, wherein the large power pulse transmitting source of the downhole instrument comprises:
   the pulse waveform being a quasi-gaussian pulse;
   maximum instantaneous pulse current >30 A;
   maximum instantaneous pulse power >100 kW; and
   pulse width <100 m.

5. The method of claim 1, wherein the receiving record system of the downhole instrument comprises:

Multichannel magnetic induction sensor receiving and channel distance: 0.25 m;

Minimum reception-transmission distance: 1.0 m; and

Time sequence recording length of reception signals: 1 s.

6. The method of claim 1, wherein the number of times for multiple transmission times is 30-100 pulses.

7. The method of claim 1, wherein calculation of the metal casing response is obtained through a numerical solution of the magnetic dipole source response of an axisymmetric radially-stratified model.

8. The method of claim 1, wherein typical parameters of the metal casing being as follows:

Inner diameter of the casing: 0.08-0.12 m;

The casing wall thickness: 0.006-0.02 m;

Electric conductivity of the casing: $10^5$-$10^7$ S/m; and

Relative magnetic conductivity of the casing: $10^2$-$10^5$.

* * * * *